UNITED STATES PATENT OFFICE.

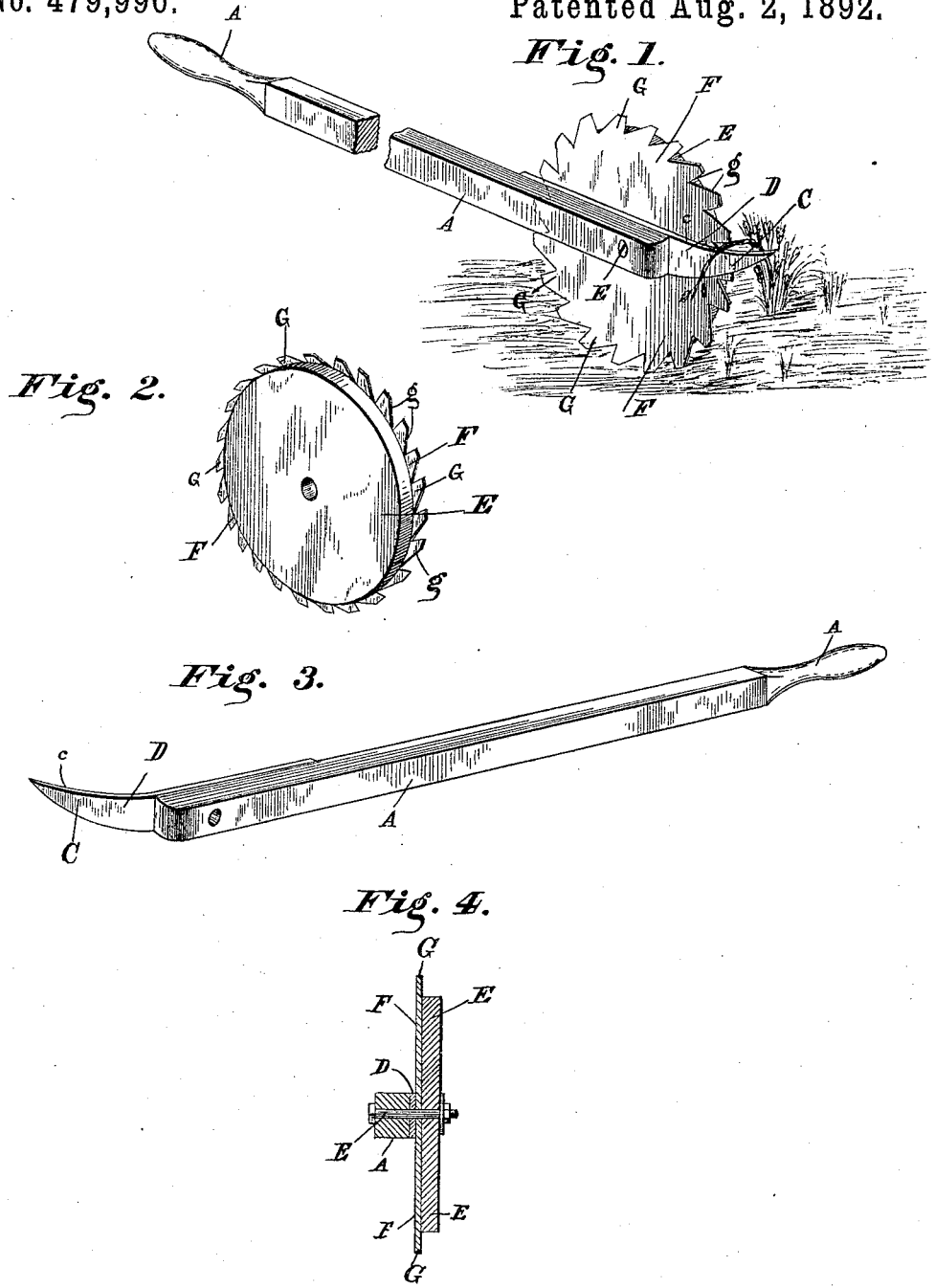

WILLIAM H. STARKS, OF BELLEVUE, WASHINGTON.

STRAWBERRY-VINE CUTTER.

SPECIFICATION forming part of Letters Patent No. 479,996, dated August 2, 1892.

Application filed March 22, 1892. Serial No. 425,917. (No model.)

*To all whom it may concern:*

Be it known that I, WILLIAM H. STARKS, a citizen of the United States, residing at Bellevue, in the county of King and State of Washington, have invented a new and useful Strawberry-Runner Cutter, of which the following is a specification.

This invention relates to cutting implements; and it has for its object to provide a device which is especially adapted for cutting the runners of strawberry-vines which radiate therefrom and are in the way in cultivating the fruit. Although the device in question is particularly adapted for such use it will be readily seen that the same is equally as well adapted for cutting weeds and runners of any description in gardening.

With these and many other objects in view, which will readily appear as the nature of the invention is better understood, the same consists in the novel construction, combination, and arrangement of parts hereinafter more fully described, illustrated, and claimed.

In the accompanying drawings, Figure 1 is a perspective view of a cutting implement constructed in accordance with my invention. Fig. 2 is a similar view of the cutting-disk and roller. Fig. 3 is a detail in perspective of the handle and the stationary blade connected therewith. Fig. 4 is a vertical sectional view of the device.

Referring to the accompanying drawings, A represents a long handle, which is grasped at its upper end by the operator, who walks along in an erect position to cut the runners. Secured to one side of and at the lower end of said handle is a stationary shear-blade D, which extends beyond the extreme lower end of said handle and terminates in an upwardly-curved cutting portion C, having a beveled cutting-edge c. Directly in rear of said lower end of the handle is located a stub-shaft E, extending through the handle and projecting upon the same side thereof to which the said stationary blade is secured. Mounted upon the extended portion of said shaft is rolling gage-wheel E, which travels upon the surface of the ground and carries the cutting-disk F, secured to the inner face thereof and working against the side of the handle. The said cutting-disk F is provided with a peripheral series of saw-teeth G, extending beyond the periphery of said wheel E, and have beveled cutting-edges g, which work against the stationary shear-blade and the cutting portion C thereof, so as to cut the runners or vines which are caught over and upon said stationary shear-blade. It will be readily seen that the said gage-wheel prevents the cutting-disk from running too deep in the ground and that by having such disk in combination with the stationary blade a cutting implement is provided which acts in the capacity of an automatic shear to cut the vines or runners as rapidly as met with.

Having thus described my invention, what I claim, and desire to secure by Letters Patent, is—

In a cutting implement, the combination, with the handle, of a stationary shear-blade secured to one end of said handle and curved up and away from the lower end thereof, a stub-shaft projecting from said handle near its lower end, a rolling gage-wheel mounted on said shaft, and a traveling cutting-disk secured to the inner face of said wheel and provided with a peripheral series of sharpened cutting-teeth extending beyond the periphery of said wheel and working against said stationary shear-blade, substantially as set forth.

In testimony that I claim the foregoing as my own I have hereto affixed my signature in the presence of two witnesses.

WILLIAM H. STARKS.

Witnesses:
 DANIEL T. CARR,
 LOUIS HENRY LEGG.